(12) United States Patent
Wang et al.

(10) Patent No.: US 12,187,621 B2
(45) Date of Patent: Jan. 7, 2025

(54) SUSTAINABLE CALCIUM HYDROXIDE PRODUCTION FOR GREEN CEMENT

(71) Applicant: WISCONSIN ALUMNI RESEARCH FOUNDATION, Madison, WI (US)

(72) Inventors: Bu Wang, Madison, WI (US); Raghavendra Ragipani, Madison, WI (US); Robert Phillip Anex, Madison, WI (US); Thatcher Wiley Root, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 684 days.

(21) Appl. No.: 17/409,893

(22) Filed: Aug. 24, 2021

(65) Prior Publication Data

US 2022/0081311 A1 Mar. 17, 2022

Related U.S. Application Data

(60) Provisional application No. 63/069,936, filed on Aug. 25, 2020.

(51) Int. Cl.
*C01F 11/12* (2006.01)
*C04B 7/42* (2006.01)
*C04B 103/00* (2006.01)

(52) U.S. Cl.
CPC ............ *C01F 11/12* (2013.01); *C04B 7/424* (2013.01); *C04B 2103/001* (2013.01)

(58) Field of Classification Search
CPC ... C01F 11/12; C04B 7/424; C04B 2103/001; C04B 14/28; C04B 22/064

USPC .......................................................... 423/639
See application file for complete search history.

(56) References Cited

U.S. PATENT DOCUMENTS

| | | | |
|---|---|---|---|
| 6,331,207 B1 * | 12/2001 | Gebhardt | ............... C04B 7/436 |
| | | | 106/751 |
| 10,266,451 B2 | 4/2019 | Hempel et al. | |
| 10,369,518 B2 | 8/2019 | Tate et al. | |
| 2003/0121457 A1 * | 7/2003 | Butters | ..................... C02F 1/56 |
| | | | 423/430 |
| 2015/0307400 A1 * | 10/2015 | Devenney | ............... C04B 28/10 |
| | | | 423/430 |
| 2017/0183264 A1 * | 6/2017 | Hempel | .............. C04B 40/0039 |

FOREIGN PATENT DOCUMENTS

DE 102022004469 A1 * 6/2024
JP 2007161515 A * 6/2007

OTHER PUBLICATIONS

Machine translation of JP-2007161515-A (Year: 2007).*

* cited by examiner

*Primary Examiner* — Pamela H Weiss
(74) *Attorney, Agent, or Firm* — Joseph T. Leone; DeWitt LLP

(57) ABSTRACT

A method of making a composition of matter comprising calcium hydroxide. The method includes the steps of contacting a calcium-containing molecule with an aqueous solution of a water-soluble salt having ammonium cation and a counter-anion, under conditions effective to yield a compound containing calcium and the counter-anion; and reacting the compound comprising calcium and the counter-anion with ammonia and water under conditions to yield calcium hydroxide.

4 Claims, 3 Drawing Sheets

- Mineral dissolution & hydrolysis $$2CaO \cdot SiO_2 + 4H^+ \rightarrow 2Ca^{+2} + SiO_2 \downarrow$$

$$4NH_4Cl \xrightarrow{H_2O} 4NH_4^+ + 4Cl^-$$

$$4NH_4^+ \xrightarrow[medium]{alk.} 4NH_3 \uparrow + 4H^+$$

Overall reaction, $$2CaO \cdot SiO_2 + 4NH_4Cl \rightarrow 2Ca^{+2} + 4Cl^- + SiO_2 \downarrow + 4NH_3 \uparrow$$

- Ammonia absorption & Precipitation $$NH_3\,(g) + H_2O \leftrightarrow NH_4^+ + OH^- \quad \text{(under pressurized conditions)}$$

$$Ca^{+2} + 2Cl^- + 2NH_4^+ + 2OH^- \rightarrow Ca(OH)_2 \downarrow + 2NH_4^+ + 2Cl^-$$

Fig. 2

SUSTAINABLE CALCIUM HYDROXIDE PRODUCTION FOR GREEN CEMENT

CROSS-REFERENCE TO RELATED APPLICATIONS

Priority is hereby claimed to provisional application Ser. No. 63/069,936, filed Aug. 25, 2020, which is incorporated herein by reference.

FEDERAL FUNDING STATEMENT

This invention was made with government support under DE-FE0031705 awarded by the US Department of Energy. The government has certain rights in the invention.

BACKGROUND

Globally, cement production is responsible for the release of about 3 billion tons of carbon dioxide ($CO_2$) per year, which is approximately 8% of total global $CO_2$ emissions. Production has increased more than thirty-fold (30×) since 1950 and almost four-fold (4×) since 1990. In the future, cement is expected to play a vital role in the expansion of the built environment, especially in emerging economies. Forecasts of global cement production in 2050 range from 3.7 to 5.5 billion tons annually. If produced using current methods, the emissions associated with the production of that amount of cement alone would account for as much as 40% of the world's carbon budget in 2050. (By "carbon budget" is meant the emissions allowable for a 50% chance of limiting the rise in average global temperature to 1.5° C. in 2050).

The barriers to the decarbonization of the cement industry are well known. More than half (about 55%) of cement-sector $CO_2$ emissions result from the thermal decomposition of limestone ($CaCO_3$) to form CaO and $CO_2$. Another roughly 40% comes from burning fossil fuels to provide the heat to drive this process. The remaining $CO_2$ balance is generated from the energy used to grind and transport the limestone and other materials. From 2014 to 2017, the direct $CO_2$ intensity of cement production increased by 0.3% per year.

Cement plants are large, expensive, and have long lifespans. As a result, the cement sector is essentially an oligopoly; it is dominated by a small number of major producers who are reluctant to change business models or experiment with new technology. Overall, when cement emissions are mentioned at all in public debate, it is typically to note that little can be done about them.

U.S. Pat. No. 10,369,518, issued Aug. 6, 2019, to Tate et al., describes a method of forming a composition of mater that comprises calcium hydroxide. The method generally includes the steps of combining particles of calcium oxide (CaO) and water to form calcium hydroxide ($Ca(OH)_2$) particles; milling the calcium hydroxide particles to reduce the particle size diameter of the calcium hydroxide particles; and then drying the calcium hydroxide particles. The resulting composition of matter has a D10 particle size distribution of from about 0.5 to about 4 micrometers, a D90 less than about 30 micrometers, a ratio of D90 to D10 of from about 8 to about 20, and a flow factor index from about 2 to about 4. The individual calcium hydroxide particles include a surface area greater than or equal to about 25 $m^2/g$.

U.S. Pat. No. 10,266,451, issued Apr. 23, 2019, to Hempel et al., describes a method to make a building material based on calcium hydroxide. The method includes the steps of mixing hemp shavings with lime to produce a structural mass. Water is then added in a sufficient amount to yield a paste that can be worked. Then at least one powder based on natural materials of volcanic origin, such as pozzalana, is added to the structural mass.

There remains a long-standing, acutely desired, and unmet need for a more sustainable method to manufacture cement—a method that does not generate such a large volume of $CO_2$.

SUMMARY

To address this long-felt, unmet need, described herein is a novel, sustainable process to manufacture the material that is most critical to cementation—calcium hydroxide ($Ca(OH)_2$). This new process utilizes a low-temperature ammonia cycle to produce calcium hydroxide from a wide range of calcium-bearing industrial waste streams such as recycled concrete and coal ashes.

Thus, disclosed herein is a method of making a composition of matter comprising calcium hydroxide. The method includes the step contacting a material comprising calcium-containing molecules with an aqueous solution comprising a water-soluble salt comprising ammonium cation and a counter-anion, for a time, and at a temperature, pH, and pressure effective to yield a compound comprising calcium and the counter-anion. Because of the presence of the ammonium salt, the pH of the reaction solution will generally be neutral to alkaline, i.e., equal to or greater than 7. The reaction is preferably carried out at room temperature (roughly 15 to 20° C.), but elevated temperatures up to the boiling point of the reaction solution at atmospheric pressure may be used. The reaction is preferably carried out at atmospheric pressure, although elevated pressures up to about 10 bar may be used.

Supernatant from the first step is rich in dissolved calcium. Supernatant from the first step is reacted is reacted with ammonia and water for a time, and at a temperature, pH, and pressure effective to yield calcium hydroxide, which precipitates from the reaction solution. This second step is preferably carried out at elevated temperatures, from about 30° C. to about 100° C. or from about 50° C. to about 75° C.

It is preferred that the water-soluble salt comprising ammonium cation and a counter-anion is halide or weak acid anions including phosphate acetate, oxalate, and lactate, most preferably ammonium chloride or ammonium acetate.

If ammonium chloride is used in the first step, the second step regenerates the ammonium chloride. The ammonium chloride so formed may optionally be recycled and used again in the first step. The same recycling strategy may be applied to other ammonium halides, and to the other water-soluble ammonium salts mentioned.

BRIEF DESCRIPTION OF THE DRAWINGS

FIG. 2 shows the chemical reactions for the mineral dissolution and hydrolysis steps described here, along with the overall combination of the two reactions (which yields $Ca^{2+}$ ions). Lastly is shown the ammonium absorption and precipitation reactions, in which the $Ca^{2+}$ ions are reacted with $Cl^-$, $NH_4^+$, and $OH^-$ ions to yield $Ca(OH)_2$, which precipitates from solution.

DETAILED DESCRIPTION

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 1 to 9, from 3.6 to 4.6, from 3.5 to 9.9, and so forth.

All references to singular characteristics or limitations of the present invention shall include the corresponding plural characteristic or limitation, and vice-versa, unless otherwise specified or clearly implied to the contrary by the context in which the reference is made. The indefinite articles "a" and "an" mean one or more.

All combinations of method or process steps as used herein can be performed in any order, unless otherwise specified or clearly implied to the contrary by the context in which the referenced combination is made.

The method disclosed herein can comprise, consist of, or consist essentially of the essential elements and limitations of the method described herein, as well as any additional or optional steps or limitations described herein or otherwise useful in chemical engineering.

The term "contacting" refers to the act of touching, making contact, or of bringing to immediate or close proximity, including at the molecular level, for example, to bring about a chemical reaction, or a physical change, e.g., in a solution or in a reaction mixture.

An "effective amount" refers to an amount of a chemical or reagent effective to facilitate a chemical reaction between two or more reaction components, and/or to bring about a recited effect. Thus, an "effective amount" generally means an amount that provides the desired effect.

Figure 1:
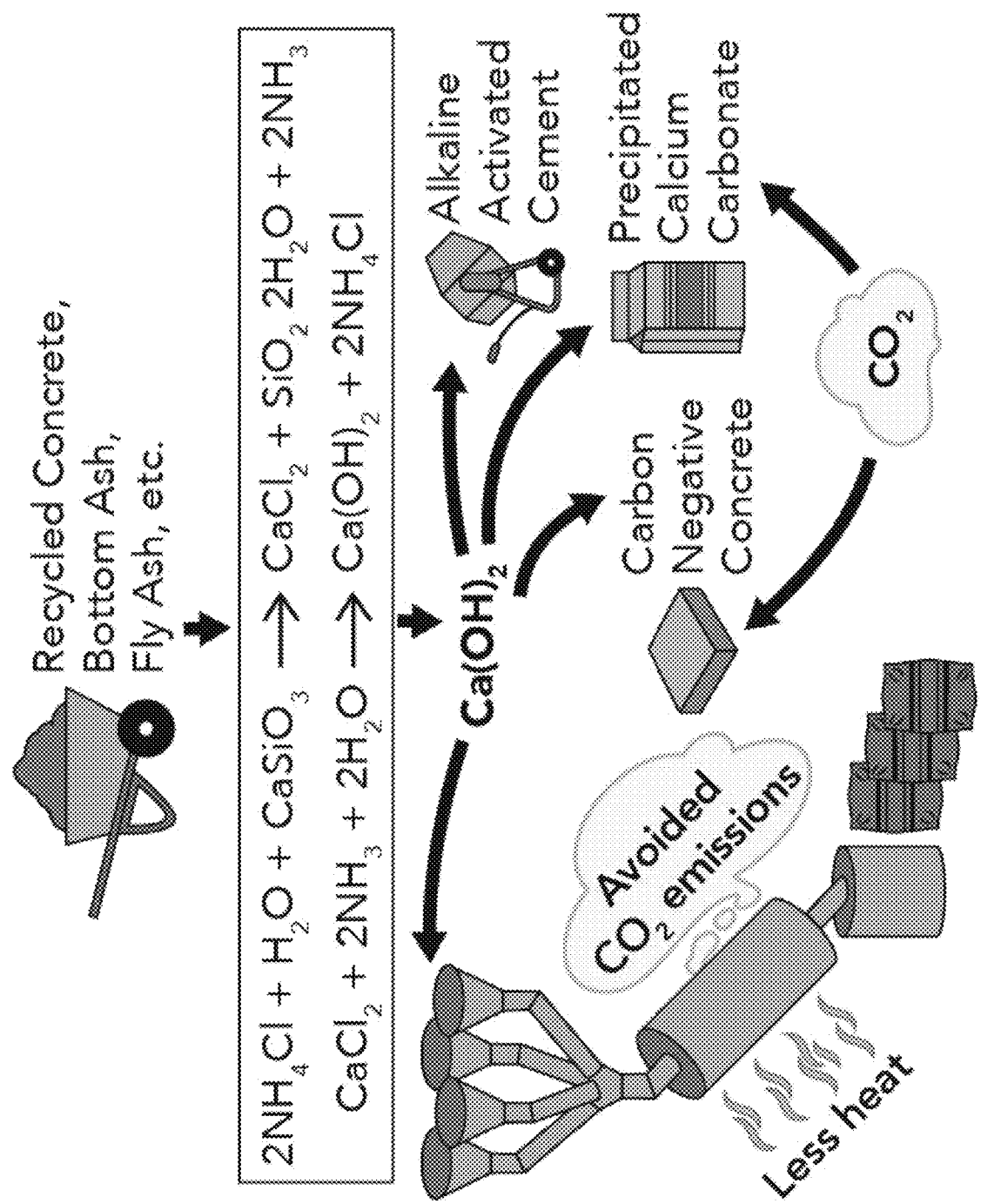
FIG. 1 is a stylized schematic diagram showing the overall method disclosed herein.

Referring now to FIG. 1, the figure is a stylized schematic diagram of the novel method to make calcium hydroxide ($Ca(OH)_2$) as disclosed and claimed herein. $Ca(OH)_2$ is a critical ingredient in cement. ($Ca(OH)_2$ is also referred to as "slaked lime.") It plays a central role in the hydration reactions that drive the curing of wet cements and concretes comprising the cements. It also plays a role in the final physical-mechanical characteristics of the cured cement/concrete.

As shown in FIG. 1, the raw material for the present method is calcium-containing waste streams, such as recycled concrete, bottom ash, fly ash, and the like. Typically, these materials are landfilled or stored in large "ash ponds." An "ash pond," also called a coal ash basin or surface impoundment, is an engineered storage structure used at fossil fuel power stations to hold bottom ash and fly ash. ("Bottom ash" is part of the non-combustible residue of combustion in coal-fired power plants, boilers, furnaces, and incinerators. Bottom ash is the heavier, non-combustible ash ("clinkers") that form inside the combustion chamber and fall to the bottom of the chamber due to gravity. The lighter portion of the ash that escapes up the chimney is "fly ash." In modern, coal-burning facilities, the lion's share of the fly ash is isolated using scrubbers and impounded in an ash pond along with the bottom ash. The ash pond is used as a landfill to prevent the release of the ash into the atmosphere. While certainly preferred to unrestricted release of the ash into the environment, ash ponds themselves are significant environmental hazards.

The method produces calcium hydroxide through an aqueous leaching-precipitation cycle aided by ammonia. The overall process is described by the following two reactions:

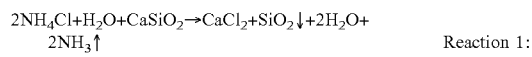

Reaction 1:

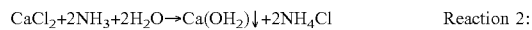

Reaction 2:

In Reaction 1, calcium ions are extracted from calcium-bearing minerals using an aqueous solution comprising a water-soluble ammonium salt, preferably an ammonium halide salt, and most preferably ammonium chloride, which is shown as the exemplary ammonium salt in Reactions 1 and 2. Reaction 1 produces calcium chloride solution (as shown in Reaction 1) or a calcium salt comprising the anion from the water-soluble ammonium salt used, along with leached mineral residue, and ammonia gas. In Reaction 2, the calcium chloride solution and ammonia gas from the first step are collected and reacted to yield calcium hydroxide, which precipitates from the aqueous solution. The second reaction utilizes the low and inverse solubility of calcium hydroxide to induce precipitation at elevated temperature and mild pressurization.

Regarding the inverse (or retrograde) solubility of calcium hydroxide, the solubility of calcium hydroxide at 70° C. is about half of its value at 25° C. This counter-intuitive phenomenon arises because the dissolution of calcium hydroxide in water is exothermic process and follows Le Chatelier's principle. Thus, at lower temperatures, the elimination of the heat liberated through the process of dissolution increases the equilibrium constant of dissolution of calcium hydroxide.

Thus, it is preferred that Reaction 2 be conducted at a pressure above atmospheric pressure and a temperature ranging from roughly 25° C. to the boiling point of the reaction solution at the pressure chosen, and more preferably from about 70° C. to the boiling point of the reaction solution at the pressure chosen. A preferred pressure range is from roughly 2 bar to about 10 bar.

The calcium hydroxide precipitate is then separated from the reaction solution by conventional means. This can be done continuously or batchwise, as is known in the industry.

After the calcium hydroxide precipitates are separated, the ammonium chloride solution is recycled for use in the leaching step shown in Reaction 1.

For a feedstock, the method can use crystalline, amorphous, or hydrated phases of calcium silicates/aluminate/aluminosilicates. Such materials are abundant in a wide range of industrial waste streams, including crushed concrete, coal ashes, steel and iron slags, etc.

The sustainable calcium hydroxide produced from this process can replace limestone as the calcium source, offering a realistic pathway to reducing the carbon footprint of the existing cement industry by more than 50%. Furthermore, when combined with concrete recycling and/or carbonation-based cementation technologies, it can transform cement production into a carbon-negative industry. The technology enables a pathway for direct capture of atmospheric carbon as precipitated calcium carbonate, a valuable co-product, and stable form of bound carbon.

On this score, the present method is a distinct improvement over conventional methods to reduce the carbon emission of cement/concrete production. Conventional methods, such as those noted above, rely on blending cement with supplementary cementitious materials such as coal fly ash or other fillers. However, the typical replacement ratio is limited to 15-30%, and it provides little benefit to cement producers.

Reactions 1 and 2 can be broken down further as shown in FIG. 2. Reaction 1 can be parsed out as three separate reactions, representing mineral dissolution and hydrolysis:

$$2CaO \cdot SiO_2 + 4H^+ \rightarrow 2Ca^{+2} + SiO_2 \downarrow \qquad 1.a:$$

$$4NH_4Cl \rightarrow 4NH_4^+ + 4Cl^- \qquad 1.b$$

$$4NH_4^+ \rightarrow 4NH_3 \uparrow + 4H^+ \qquad 1.c:$$

The overall Reaction 1, excluding the water molecules, is thus:

$$CaO \cdot SiO_2 + 4NH_4Cl \rightarrow 2Ca^{+2} + 2Ca^{+2} + 4Cl^- + SiO_2 \downarrow + 4NH_3 \uparrow \qquad 2$$

Similarly, Reaction 2 can be broken down as follows, representing ammonia absorption and precipitation of calcium hydroxide:

$$NH_3(g) + H_2O \leftrightarrow NH_4^+ + OH^- \text{ (at increased pressure)} \qquad 2.a:$$

$$Ca^{+2} + 2Cl^- + 2NH_4^+ + 2OH^- \rightarrow Ca(OH_2) \downarrow + 2NH_4^+ + 2Cl^- \qquad 2.b:$$

Figure 3:
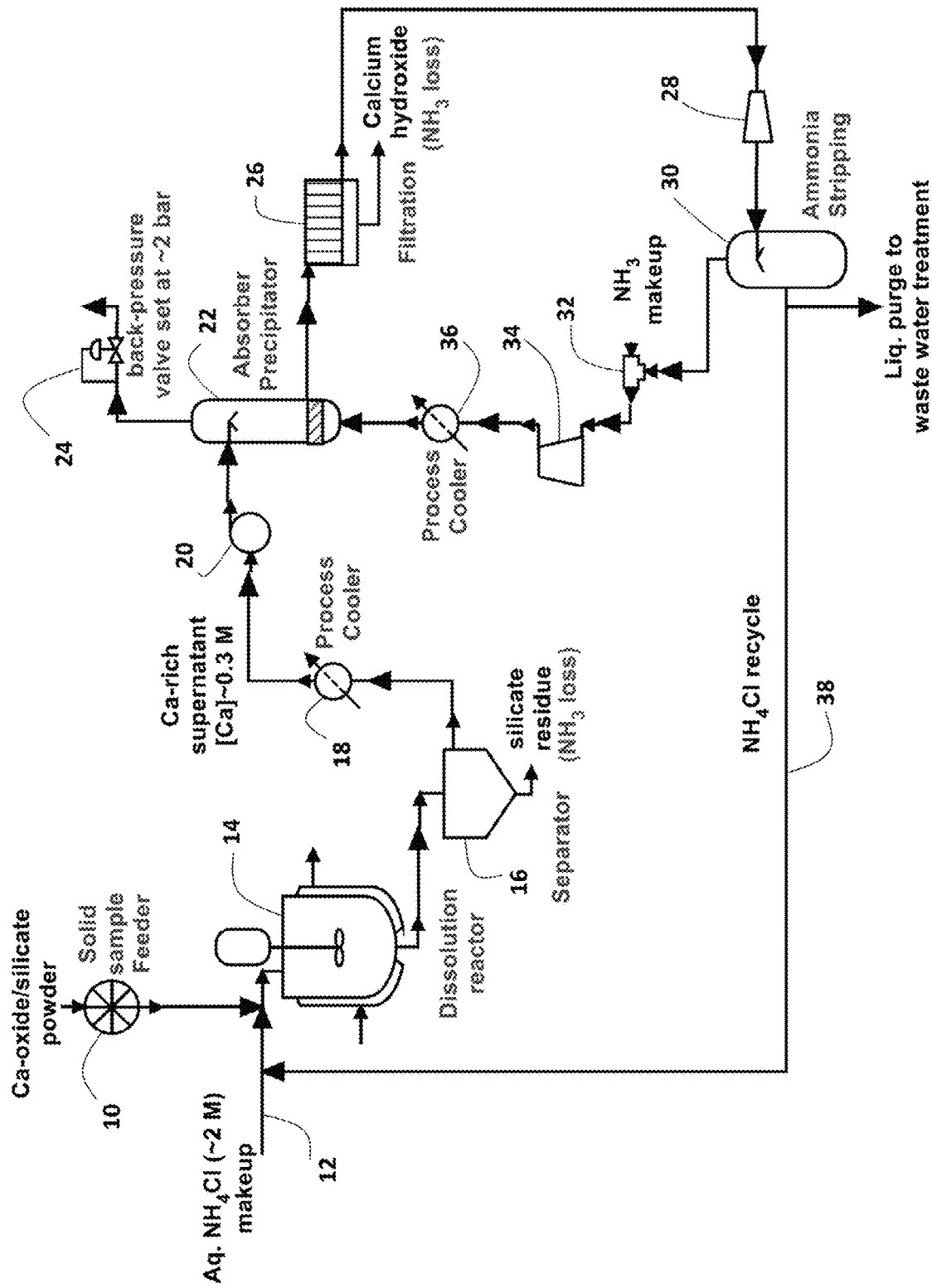
FIG. 3 is a formal schematic diagram showing an exemplary apparatus that can be used to practice the method disclosed and claimed herein.

FIG. 3 shows an exemplary schematic implementation of the method disclosed and claimed herein. The various apparatus and conduit shown in FIG. 3 is conventional and will not be described in any detail. Starting at the upper left corner of FIG. 3, the incoming powdered feedstock is fed into the process via a solid sample feeder 10. The feedstock, along with ammonium chloride 12 (which can be virgin or recycled from the process) are fed into a jacketed, temperature-controlled, stirred dissolution reactor 14. Reaction 1 takes place within reactor 14. The reactants may be reacted at room temperature up to the boiling point of solution (roughly 100° C.) and for a time sufficient to dissolve at least a portion of any calcium compound present in the feedstock.

The reaction solution is then transferred to separator/settling tank 16, which is dimensioned and configured to separate any precipitates from the reaction solution (principally $SiO_2$). The calcium-rich supernatant is optionally cooled (if necessary) at process cooler 18 and pumped via pump 20 into reactor 22. Reactor 22 is operationally connected to a back-pressure regulator 24. As noted in FIG. 3, the preferred pressure for the reaction in reactor 22 is about 2 bar. Reaction 2 takes place in reactor 22.

The contents of reactor 22 are then transferred to separator/filtration unit 26 to recover the precipitated calcium hydroxide.

Ammonia recovered in separator 26 is recycled back into the process via condenser 28 and a separator 30. The separator 30 is dimensioned and configured to separate ammonia from the process water. The water is purged from the apparatus and send for treatment. The ammonia is sent to an ammonia make-up unit 32. Unit 32 is dimensioned and configured to mix the recycled ammonia with fresh ammonia and re-introduced into reactor 22 after optionally being passed through mixer 34 and chiller 36.

Additionally, $NH_4Cl$ present in the effluent from separator 26 is likewise recycled as shown at conduit 38 and used to dissolve the incoming feedstock. Make-up $NH_4Cl$ may also be added at 12.

The apparatus shown in FIG. 3 is exemplary only. Other equally suitable means for implementing the method will be apparent to chemical engineers of ordinary skill in the art.

What is claimed is:

1. A method of making a composition of matter comprising calcium hydroxide, the method comprising:
    (a) contacting a feedstock comprising a material selected from the group consisting of crystalline, amorphous, or hydrated phases of calcium silicate, calcium aluminate, calcium aluminosilicate, and combinations thereof with an aqueous solution comprising a water-soluble salt comprising ammonium cation and a counter-anion, for a time, and at a temperature, pH, and pressure effective to yield a compound comprising calcium and the counter-anion; and
    (b) reacting at least a portion of the compound comprising calcium and the counter-anion with ammonia and water for a time, and at a temperature, pH, and pressure effective to yield calcium hydroxide.

2. The method of claim 1, wherein the water-soluble salt comprising ammonium cation and a counter-anion is selected from the group consisting of ammonium halide, ammonium acetate, ammonium phosphate, ammonium oxalate, and ammonium lactate.

3. The method of claim 1, wherein the water-soluble salt comprising ammonium cation and a counter-anion is ammonium chloride or ammonium acetate.

4. The method of claim 1, wherein step (b) yields calcium hydroxide and ammonium halide and further comprising:
    (c) recycling at least a portion of the ammonium halide formed in step (b) and using it as the water-soluble salt comprising ammonium cation and a counter-anion.

* * * * *